J. W. MOTT.
HEADLIGHT TURNING MECHANISM FOR VEHICLES.
APPLICATION FILED SEPT. 10, 1915.

1,203,769.

Patented Nov. 7, 1916.

Inventor:
James W. Mott
by Thurston & Kwis
Attys.

UNITED STATES PATENT OFFICE.

JAMES W. MOTT, OF CRESCO, IOWA.

HEADLIGHT-TURNING MECHANISM FOR VEHICLES.

1,203,769.  Specification of Letters Patent.  Patented Nov. 7, 1916.

Application filed September 10, 1915. Serial No. 49,854.

*To all whom it may concern:*

Be it known that I, JAMES W. MOTT, a citizen of the United States, residing at Cresco, in the county of Howard and State of Iowa, have invented a certain new and useful Improvement in Headlight-Turning Mechanism for Vehicles, of which the following is a full, clear, and exact description.

This invention relates to headlight turning mechanism for vehicles, and particularly automobiles, and has for its chief object to provide a construction which is operated by the steering mechanism, and is so constructed and operated that when the steering mechanism is turned both headlights turn simultaneously in the direction that the vehicle is to turn.

A further object is to provide between the steering mechanism and the headlights movement transmitting means which is simple, is composed of a minimum number of parts and requires practically no more effort on the part of the driver to turn the car and the headlights than is now required to guide the vehicle with stationary headlights.

The invention may be briefly summarized as consisting in certain novel details of construction and combinations and arrangements of parts which will be described in the specification and set forth in the appended claim.

Figure 2:
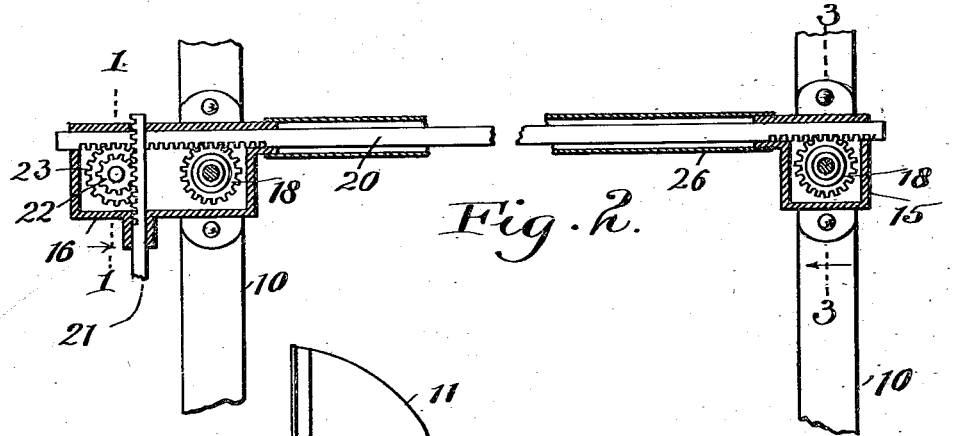
Figure 1:
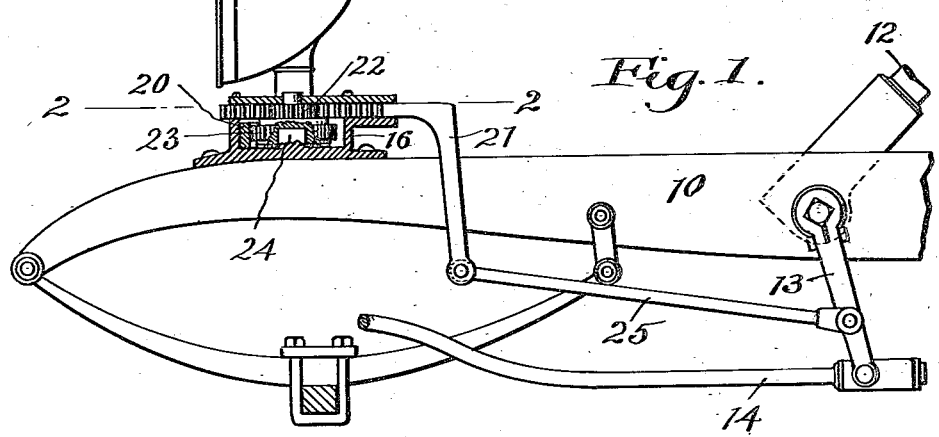
Figure 3:
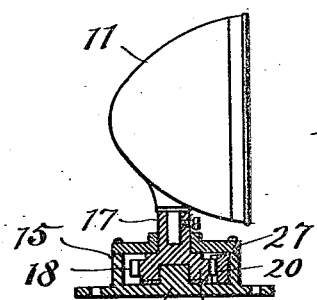

In the accompanying sheet of drawings wherein I have shown one embodiment of my invention, Figure 1 is a side view of the front part of the chassis of an automobile equipped with my invention, certain parts being in section along the line 1—1 of Fig. 2; Fig. 2 is a top plan view of the same partly in section along the line 2—2 of Fig. 1; and Fig. 3 is a detached view of one of the lamps showing in section the corresponding gear box and the mechanism for turning the headlight, the section being taken substantially along the line 3—3 of Fig. 2 looking in the direction indicated by the arrow.

Referring now to the drawings, 10 represents the side frame members of the chassis of an automobile which are provided with movable headlights 11. The steering gear or steering mechanism may be of the usual or standard construction and consists of the usual steering column 12 and the lower steering lever or arm 13 to which is connected the usual steering rod 14 which extends forwardly to the steering knuckles of the front wheels. It will be seen by reference to particularly Fig. 2 that on both chassis members 10 are mounted a pair of gear boxes or housings 15 and 16, one of which is somewhat larger than the other and projects laterally beyond the chassis frame member on which it is mounted.

Both headlights 11 are rotatably supported and are secured to vertical members projecting upwardly through the top walls of the housings. The headlights may be rotatably mounted or supported in different ways but in this case they are secured to studs 17, each provided at its lower end with a pinion 18, the said stud and pinion being journaled on an upright stud 19 projecting upwardly from the base of the housing.

Both headlights are adapted to be turned simultaneously in proportion to the turning movement which is given to the steering wheels by a horizontal endwise movable rod or rack 20 which extends across the vehicle through both housings 15 and 16 and is provided near both ends with rack teeth which engage the two pinions 18 which are connected to the headlights. This means for turning both headlights, consisting of the pinions connected to the lower end of the lamp supporting members and the endwise movable rod or rack which engages and turns the pinions simultaneously equal amounts, constitutes an important part of this invention and it is principally due to this construction that the headlight mechanism as a whole is simple and very easily operated.

Movement is transmitted from the steering mechanism to the endwise movable rod or rack 20 by means including a supplemental rack 21 which is supported in the front and rear walls of the housing 16 for movement at right angles to the rod or rack 20. This second rack engages a pinion 22 to which is connected or integrally formed a second pinion 23, both being journaled in this instance on a stud 24 projecting upwardly from the base of gear box or housing 16 and located laterally beyond the stud 19 supporting the pinion 18 which turns with the adjacent headlight. This second pinion 23 which, as here shown, is beneath and somewhat larger than the pinion 22 engages the teeth of the rod or rack 20, so that when the rack 21 is shifted in an endwise direction through the pinions 22 and 23 endwise movement is imparted to the rod or rack 20 and hence to the two headlights.

The rear end of the rack 21 is turned downwardly as shown in Fig. 1, and to its lower end is pivotally connected a rod 25 which at its rear end has a pivotal connection directly or indirectly with the steering lever 13 of the main steering mechanism. It will be understood that when the steering lever 13 is swung during the steering of the vehicle, the endwise movement of the rod 25 is transmitted to the rack 21 and hence through the train of mechanism previously described to the two headlights. It will be understood further that the gears or pinions will be so proportioned that the proper movement will be imparted to the headlights when the steering mechanism and steering wheels are turned a predetermined amount.

The gear housings are preferably supplied with semi-solid lubricant and the portion of the rod 20 extending between the housings may be inclosed in a sleeve 26 which may also be supplied with the lubricant so that all parts work very freely. The housings are made practically dust-proof and preferably the bottom, sides and end walls of the housings are formed in one integral part so that the parts which support the pinions, lamps and racks will not be easily bent or broken nor loosened by vibration. This feature of construction enhances the durability and efficiency of the mechanism. The housings may and preferably are provided with removable top plates 27 which assist in journaling the studs 17 supporting the headlights.

Although my invention is preferably employed to turn both headlights it may be used to some advantage for turning only one of the headlights and in that case the rod or rack 20 will be shorter than here shown and need extend simply through the housing 16 and the other headlight may then be supported in fixed position in any suitable or customary manner.

Having thus described my invention, what I claim is:—

In a motor vehicle, a chassis; a pair of casings supported by the side frame members of the chassis; vertical spindles extending upwardly from said casings; headlights mounted thereon; gears secured to said spindles and located within the casings, said casings having alined openings constituting bearings; a rack extending transversely across the front of the vehicle and mounted in said bearing openings, said rack engaging the gears on said spindles, one of said casings having alined bearing openings at right angles to the first-named openings; a second rack adapted to be moved endwise through said second set of bearing openings; and gearing for transmitting movement from the last mentioned rack to the first mentioned rack.

In testimony whereof, I hereunto affix my signature in the presence of two witnesses.

JAMES W. MOTT.

Witnesses:
E. B. GILCHRIST,
L. I. PORTER.